May 28, 1957 S. M. FRANK 2,793,938
PRODUCTION OF A HYDROGEN RICH GAS AND REMOVAL
OF CARBON CONTAINED THEREIN
Filed Dec. 15, 1954
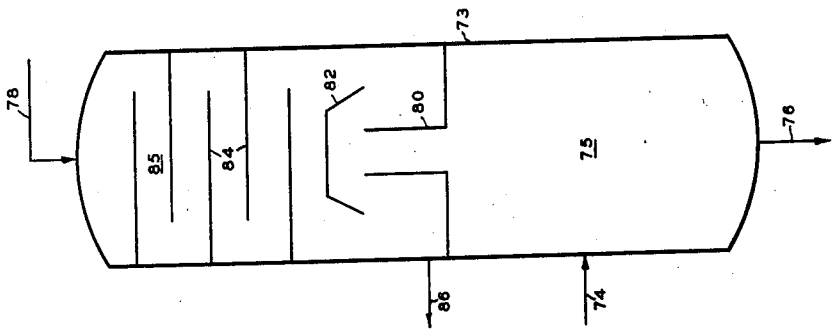
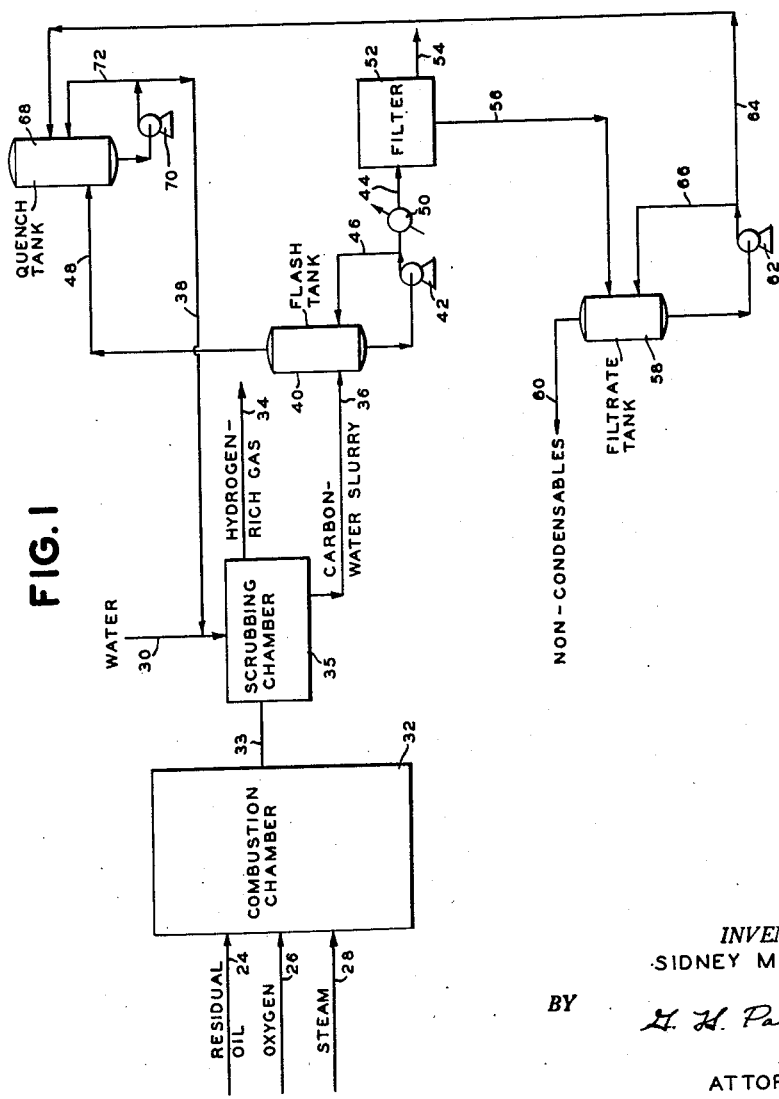
INVENTOR.
SIDNEY M. FRANK
BY
ATTORNEYS 2,793,938
Patented May 28, 1957

2,793,938

PRODUCTION OF A HYDROGEN RICH GAS AND REMOVAL OF CARBON CONTAINED THEREIN

Sidney M. Frank, West Orange, N. J., assignor to The M. W. Kellogg Company, Jersey City, N. J., a corporation of Delaware Application December 15, 1954, Serial No. 475,508

5 Claims. (Cl. 23—212)

This invention relates to the recovery of heat and solids from a solids-water slurry. More particularly it relates to the recovery of heat and carbon from a carbon-water slurry produced in the conversion of a carbonaceous material to a gaseous product rich in hydrogen.

Several processes are available in the art for preparing gases rich in hydrogen which are suitable for use in the synthesis of hydrocarbons by the Fischer-Tropsch reaction, in ammonia synthesis or in the synthesis of oxygenated organic compounds, such as methanol and isobutanol. The methods utilized commercially differ in their application and depend on the type and composition of feed stocks available for conversion. For example, when it is desired to convert a normal gaseous hydrocarbon material, furnace reforming in the presence of a reforming catalyst is often preferred. When heavier hydrocarbons are used to prepare a hydrogen-rich gas, that is, those hydrocarbons which are not normally gaseous, for example, hydrocarbons or hydrocarbon mixtures having components of five or more carbon atoms, hydrocarbon fractions such as naphtha, kerosene, heating distillates, light and heavy gas oil, topped crudes, residual oils, lubricating oil fractions, asphalt and other hydrocarbon oils, partial oxidation with oxygen is frequently used. The latter process is also used when it is desired to convert solid carbonaceous materials such as coals, lignites, shale, etc., to a hydrogen-rich gas. It is with this method of converting carbonaceous materials, that is by partial oxidation that this invention is concerned.

A certain amount of carbon is almost unavoidably produced as a by-product in the process of converting solid carbonaceous materials and hydrocarbons to hydrogen. Since the carbon is normally produced in a finely divided state and thus is entrained at least in part in the product gases, it is easily carried from the reaction zone and may cause equipment plugging and costly shutdowns. For this reason, it is desirable to effect separation of the carbon from the product gases as soon as possible after completion of the partial oxidation reaction. One method of doing this comprises contacting the gases with water to knock out the carbon. The carbon then is conveniently removed from the system as a slurry in the water. Since the reaction gases are cooled by this method from a high to a relatively low temperature, a large amount of water is required. The carbon-water mixture although relatively low in temperature contains a large amount of heat because of its bulk. It is desirable to recover this heat in a usable form and at the same time separate carbon from the carbon-water slurry.

It is an object of this invention to provide an improved method of recovering solids and heat from a solids-water slurry.

Another object of this invention is to provide an improved process for the production of a hydrogen-rich gas suitable for use in the synthesis of ammonia, hydrocarbons and oxygenated organic compounds.

Still another object of this invention is to provide an improved method of recovering carbon produced in the partial combustion of hydrocarbons to produce a gas rich in hydrogen.

Yet another object of this invention is to recover heat from a carbon-water slurry produced in the removal of carbon from effluent gases from the partial combustion of hydrocarbons.

These and other objects of the invention will become more apparent from the following detailed description and discussion.

In its broad aspect this invention comprises treating a hot solids-water slurry, maintained under super atmospheric pressure, to separate the solids and recover heat by first passing the slurry to a zone of low pressure and thereby flashing part of the water, further cooling the remaining slurry by indirect heat exchange, separating the solids from the slurry by a conventional low pressure separation process and combining the substantially carbon free water with the water flashed in the low pressure zone to provide a high temperature water stream for further use.

In a more specific aspect of this invention a carbonaceous material is converted under super atmospheric pressure to a gas rich in hydrogen, and carbon produced in the reaction is scrubbed from the effluent gas with water. A slurry of carbon in water is removed from the scrubbing zone and passed to a zone of lower pressure wherein a portion of the water is flashed as steam and the slurry is lowered in temperature. The slurry is then cooled still further by indirect heat exchange and passed through a filtering step for the removal of carbon. The low temperature filtrate from this step is combined with the steam from the low pressure zone whereby the steam is condensed and the filtrate is heated and the heated liquid is returned to the scrubbing zone.

As indicated above this invention is broad in scope and it is not intended that its application be restricted to the processing of a carbon-water slurry, nor that it be limited by the specific process disclosed, namely the preparation of a gas rich in hydrogen. It may also be used to advantage in recovering solids and heat from any solids-water mixture maintained under super atmospheric pressure, for example such as a solids-water slurry obtained from a fluid catalytic cracking process, or a fluid coking process, or a fluid hydroforming process etc. Any solids separable from water by filtration or by other low pressure separation means may be processed, including inert materials such as sand, pumice, quartz, etc., and materials having catalytic properties, for example metals and oxides thereof such as silica, alumina, boria, etc., and other common solid catalytic materials. In its preferred embodiment this invention contemplates reuse of the high temperature water stream, more usually in the solids-scrubbing step, however, other use of this stream is also within the scope of the invention, such as for example as a heat exchange medium.

The conditions required for the conversion of carbonaceous materials to a gas rich in hydrogen by partial oxidation have been disclosed in numerous patents and are well known in the art. In general, elevated temperatures are required, that is between about 1500° F. and about 3000° F., the preferred temperature depending on the feed stock employed. Steam may be used in the reaction to control the temperature and may also be used to reduce the partial pressure of the oil, if a hydrocarbon feed is used. The process may be carried out over a wide range of pressures from about atmospheric to as high as 1000 p. s. i. g., however, since the synthesis processes previously mentioned, and particularly the synthesis of ammonia, are usually carried out under high pressures it is customary to operate at pressures substantially above atmospheric.

In the subsequent discussion and description the invention will be considered in relation to the treatment of a carbon-water slurry resulting from a partial combustion process; however, as stated previously this is not intended in any way to limit the scope of the invention.

Any of the carbonaceous materials previously mentioned and including normally gaseous hydrocarbons may be used in preparing the hydrogen-rich gas, however, more usually the lighter compounds and hydrocarbon fractions down through gas oil, and the lube oil fractions are more valuable for the other uses. As a result, the available feed materials are normally limited to the heavier petroleum fractions ranging in gravity from about 30 to as low as —5° API; namely, topped crude oils, residual oils, fuel oils, asphalt, etc., and to solid carbonaceous materials. In view of the present excess of heavy residual oils these materials are particularly attractive as feed stocks from an economic view point.

The oxygen required in carrying out the partial oxidation process may be provided as a relatively pure material or it may be a mixture of oxygen and other components; for example, air or air enriched with oxygen. When the effluent from the partial combustion reaction is to be used in the synthesis of ammonia, it may be desirable to supply the oxygen as air in order to provide the nitrogen required in the ammonia synthesis. In preparing a gas for use in other synthesis processes, it is usually advantageous to carry out the partial oxidation reaction with relatively pure oxygen in order to reduce the quantity of gases in the reaction effluent. Even if ammonia is the product ultimately desired it may be advantageous to use relatively pure oxygen in order to reduce the quantity of gases in the reaction zone and thus the size of the reaction zone required.

In a typical embodiment of this invention, a residual oil and water or steam are pre-heated and introduced into a combustion zone wherein they are reacted with oxygen, or an oxygen-containing gas. As a result of the reactions which take place, the hydrocarbon feed is substantially converted to a mixture of hydrogen, carbon monoxide and carbon dioxide, with some free carbon in the form of small particles. The over-all reaction is highly exothermic and the product gases leave the combustion zone at an elevated temperature. In order to decrease the volume of gas to be handled, both in the combustion zone and in the subsequent processing steps, a high pressure is maintained on the system.

Removal of carbon from the reaction gases is effected by contacting them with water in a scrubbing zone to form a carbon-water slurry. The mixture of carbon and water is then passed from the combustion zone through an expansion step whereby a portion of the water present is flashed as steam and the remaining slurry is lowered in temperature. The slurry is then filtered to remove the carbon. To prevent excessive amounts of water from flashing in the filtering step, which is normally carried out under low pressures, frequently less than atmospheric, it is necessary before filtering to further cool the carbon-water slurry. This may be conveniently carried out by conventional indirect heat exchange or by other conventional methods. The water filtrate which remains after the carbon is removed from the slurry is at a temperature substantially lower than the temperature of the steam previously flashed from the slurry. To increase the heat content of the filtrate and effectively utilize this low pressure steam, the two are combined, thereby condensing the steam and substantially increasing the quantity and temperature of the filtrate. The hot filtrate is then recycled for reuse as scrubbing water.

The amount of recoverable heat regained by this method of operation is dependent on two factors, the pressure at which steam is formed in the expansion step and the temperature of the carbon-water slurry prior to filtering. Further, the quantity of water vaporized from the carbon-water slurry and the temperature of the steam and unvaporized slurry are dependent on the reduction in pressure which takes place in the expansion step. Obviously, any reduction in pressure will provide some steam, and the combination of this steam with cold filtrate will provide a warmer recycle water than would otherwise be available. As the pressure in the expansion step is progressively decreased, more and more steam is formed, but at progressively lower temperatures. Ultimately, a minimum pressure between about 14 and about 20 p. s. i. g. is reached. This minimum exists when the quantity, the temperature and heat content of the steam are such that condensation of this material in the filtrate raises the temperature of the filtrate to the steam temperature. It is impossible to expand below this pressure and still condense all of the steam in the filtrate for maximum heat recovery. Of course if there is a use for excess low pressure steam elsewhere in the process, the aforesaid minimum pressure does not apply and the expansion step may be carried out down to essentially atmospheric pressure. It is within the scope of this invention to expand the carbon-water slurry to any pressure down to atmospheric; however, to provide for maximum recovery of heat in the filtrate, operation at or around the aforesaid minimum pressure is contemplated.

Conventional methods of separating liquids and solids, in particular, filtration, involve operating at pressures near or below atmospheric, usually between about 2.0 and about 14.7 p. s. i. a. Since the pressure of the carbon-water slurry leaving the expansion step is substantially above the filtration pressure and the water in the slurry is at its boiling point it is necessary to cool the slurry before filtration in order to prevent appreciable vaporization of water during this operation. The extent of this cooling varies with the filtration pressure, and the lower said pressure, the more cooling is required. In the usual operation it is necessary to cool the slurry to a temperature between about 70° F. and about 125° F. before it enters the filter. It is possible to cool the slurry to the filter to a lower temperature than is necessary to prevent vaporization during filtration and thereby lower the minimum allowable pressure in the expansion step and still obtain complete condensation of the flashed steam in the filtrate. This, however, decreases rather than increases the heat recovery, therefore, it is preferred to limit slurry cooling prior to filtration to a minimum.

The method of operation described above effectively recovers the major portion of the carbon product and at the same time makes it possible to recover a maximum amount of heat from the slurry water heat which in a conventional operation would be lost from the system.

In order to more clearly illustrate the invention and to provide a better understanding thereof, reference is had to the accompanying drawings of which:

Figure I is a diagrammatic illustration of a process flow arrangement for carrying out an embodiment of the invention and Figure II is an alternate arrangement in which the slurry expansion and steam condensation steps are carried out in a single vessel.

Referring to Figure I, a residual oil, oxygen and steam are introduced through conduits 24, 26 and 28 respectively into a combustion chamber 32 maintained under suitable conditions of temperature and pressure to provide a gaseous reaction product rich in hydrogen. In this specific illustration, the temperature is maintained at about 2200° F. and the pressure substantially above atmospheric, namely about 450 p. s. i. g. Gaseous effluent from the combustion chamber containing free carbon in the form of small particles is passed through conduit 33 into a scrubbing chamber 35 wherein it is contacted with water introduced through conduit 30 to remove the carbon. The temperature of the scrubbing water prior to its admission into the scrubbing chamber is about 250° F. A mixture of the carbon and water, in the form of a slurry is passed from the scrubbing chamber through conduit 36 and the hydrogen-rich gas product exits through conduit 34.

In the process of removing the carbon from the reaction gases the water admitted to the scrubbing chamber is heated and the carbon-water mixture leaves this chamber at a temperature of about 400° F. It is desirable to recover a maximum amount of the heat from the slurry and return it to the scrubbing chamber, preferably by recycling the slurry water. In order to provide a reusable water stream it is necessary first to effect the removal of carbon from the carbon-water slurry. As the initial step in this process, the mixture of carbon and water is passed through conduit 36 and into a flash tank 40 which is maintained at a lower pressure than the pressure existing in the combustion chamber, namely about 20 p. s. i. g. This reduction in pressure causes a portion of the water in the slurry to vaporize and form steam, which passes from the flash tank through conduit 48. The remaining slurry is cooled thereby to about 260° F. The cooled material is withdrawn from the flash tank through conduit 44, is passed through conduit 44 and heat exchanger 50 into filter 52. To provide agitation of the slurry and prevent stoppage a portion of the cooled slurry may be recycled to the flash tank through conduit 46.

The construction of the conventional filter is such that it is not readily adapted to high pressure operation. As a result filtering operations are usually carried out at atmospheric and less than atmospheric pressure. In this particular illustration the filtration step is carried out at below atmospheric pressure and to prevent flashing of the water during filtration, the slurry is cooled by indirect heat exchange to about 115° F. in exchanger 50 before being admitted to the filter. Two streams leave the filter. The separated carbon exits through conduit 54 for further handling or processing (not shown). The water filtrate leaves through conduit 56 and enters filtrate tank 58 wherein non-condensables admitted to the system in the filtering operation, primarily air, are vented through conduit 60. The low temperature filtrate is then removed from tank 58 by pump 62 and is passed through conduit 64 into quench tank 68. If desired, a portion of this material may be recycled to the filtrate tank through conduit 66. Steam from flash tank 40 also enters the quench tank through conduit 48 and is combined with the filtrate thereby condensing the steam and increasing the temperature of the filtrate to about 250° F. To assure complete condensation, it is preferred to admit the steam beneath the level of filtrate liquid in quench tank 68. The total liquid stream now at a substantially higher temperature and having a much greater heat content is removed from the quench tank through pump 70, a portion is recycled through conduit 72 and the net liquid is passed through conduit 38 to join the water entering the scrubbing chamber.

The following are presented as typical conditions encountered in carrying out this invention on a commercial scale.

EXAMPLE

*Carbon separation and heat recovery step*

Flows:

| | Rate, lb./hr. |
|---|---|
| Slurry to flash tank: | |
|    Carbon | 360 |
|    Water | 34,800 |
| Steam to quench tank | 4,600 |
| Slurry to filter: | |
|    Carbon | 360 |
|    Water | 30,200 |
| Filter cake: | |
|    Carbon | 320 |
|    Water | 1,300 |
| Filtrate: | |
|    Carbon | 40 |
|    Water | 28,900 |
| Combined steam and filtrate: | |
|    Carbon | 40 |
|    Water | 33,500 |

Temperatures: ° F.

| | |
|---|---|
| Slurry to flash tank | 380 |
| Flash tank | 260 |
| Filter | 115 |
| Quench tank | 250 |

Pressures: P. s. i. g.

| | |
|---|---|
| Slurry to flash tank | 400 |
| Flash tank | 20 |
| Filter | −5 |
| Quench tank | 14 |

Various modifications of the process illustrated and specifically described are included within the scope of the invention. For example, as previously mentioned it is not necessary to limit the invention to a carbon-water slurry; any solids removable by filtration or other conventional low pressure separation means may be processed in a similar manner.

In the specific illustration in Figure I, the flash tank 40 and quench tank 68 are shown as separate vessels. This is not essential to the invention and the separate functions performed in these vessels may be carried out in a single vessel as shown in Figure II. Referring to Figure II, the carbon-water slurry enters the low pressure flash zone 75 of vessel 73 through conduit 74 and the slurry cooled by expansion leaves through conduit 76. Low pressure steam flashed in this zone passes upward through a drawoff tray 80, around baffle 82 and up through baffles 84. Cool filtrate from filtrate tank 58 enters the quench zone 85 of vessel 73 and passes downward countercurrent to the rising steam, thereby condensing this material. The heated filtrate and the condensed steam accumulate on drawoff tray 80 from which the combined liquid is withdrawn through conduit 86 for recycle to the scrubbing chamber 35.

When using either vessel arrangement illustrated, the temperature and pressure of the combined water filtrate and steam condensate is governed by the temperature and pressure of the slurry leaving the scrubbing chamber 35 and by the filtrate temperature. As previously discussed the amount of steam flashed in the low pressure zone and the temperature of the combined filtrate and steam may be controlled within limits by varying the steam pressure. Normally this is accomplished by partially obstructing the flow of steam through conduit 48 in Figure I or by decreasing the size of the opening in the drawoff tray 80 in Figure II.

Having thus described the invention by reference to a specific example thereof, it is understood that no undue limitations or restrictions are to be imposed by reason thereof, but that the scope of the invention is defined by the appended claims.

I claim:

1. In a conversion process in which a carbonaceous material is partially oxidized in a reaction zone under super atmospheric pressure in the presence of oxygen and steam to produce a hot gaseous product containing free carbon and the hot gaseous product is contacted with hot water in a scrubbing zone to remove the carbon and form a carbon-water slurry, the improvement which comprises passing the carbon-water slurry while under pressure to a zone of lower pressure wherein a portion of the water in the slurry is flashed as steam, separately removing the steam and slurry from the zone of lower pressure, passing the slurry through a cooling zone wherein its temperature is substantially lowered, passing the cooled slurry to a separation zone for the removal of carbon, combining the carbon free water with the steam removed from the zone of lower pressure, thereby condensing the steam and heating the water and returning the heated water to the scrubbing zone.

2. An improved method of recovering finely divided solids and heat from a hot solids-water slurry under super atmospheric pressure which comprises passing the slurry while under pressure to a zone of lower pressure wherein a portion of the water in the slurry is flashed as steam, separately removing the steam and slurry from the zone of lower pressure, passing the slurry to a cooling zone wherein the slurry temperature is substantially lowered, passing the cooled slurry to a separation zone for the removal of solids present as such and combining the solids free liquid with the steam removed from the zone of lower pressure, to condense the steam and heat the liquid thereby providing a high temperature water stream.

3. An improved method of recovering finely divided carbon and heat from a hot carbon-water slurry under super atmospheric pressure which comprises passing the slurry while under pressure to a zone of lower pressure wherein a portion of the water in the slurry is flashed as steam, separately removing the steam and slurry from the zone of lower pressure, passing the slurry to a cooling zone wherein the slurry temperature is substantially lowered, passing the cooled slurry to a filtering zone for the separation of carbon and combining the carbon free filtrate with the steam removed from the zone of lower pressure, to condense the steam and heat the filtrate thereby providing a high temperature water stream.

4. In a conversion process in which a carbonaceous material is partially oxidized in the presence of oxygen and steam in a reaction zone to produce a hot gaseous product rich in hydrogen containing free carbon and the hot gaseous product is contacted with hot water in a scrubbing zone to remove the carbon and form a carbon-water slurry, the improvement which comprises passing the carbon-water slurry while under pressure to a zone of lower pressure wherein a portion of the water in the slurry is flashed as steam, separately removing the steam and slurry from the zone of lower pressure, passing the slurry through a cooling zone wherein its temperature is substantially lowered, passing the cooled slurry to a filtering zone for the separation of carbon, combining the carbon free filtrate with the steam removed from the zone of lower pressure, thereby condensing the steam and heating the filtrate and returning the heated filtrate to the scrubbing zone.

5. In a process in which a hot gaseous material containing entrained solids and maintained at an elevated temperature and under super atmospheric pressure is contacted with hot water in a scrubbing zone to remove the solids and form a solids-water slurry, the improvement which comprises passing the slurry while under pressure to a zone of lower pressure wherein a portion of the water in the slurry is flashed as steam, separately removing steam and slurry from the zone of lower pressure, passing the slurry to a cooling zone wherein the slurry temperature is substantially lowered, passing the cooled slurry to a separation zone for the removal of solids present as such, combining the solids free water with the steam removed from the zone of lower pressure, thereby condensing the steam and heating the water and returning the heated water to the scrubbing zone.

References Cited in the file of this patent
UNITED STATES PATENTS

| | | |
|---|---|---|
| 2,585,659 | Kilpatrick | Feb. 12, 1952 |
| 2,587,107 | Cade | Feb. 26, 1952 |
| 2,668,754 | Lichtenfels | Feb. 9, 1954 |
| 2,677,439 | Hedberg | May 4, 1954 |